UNITED STATES PATENT OFFICE.

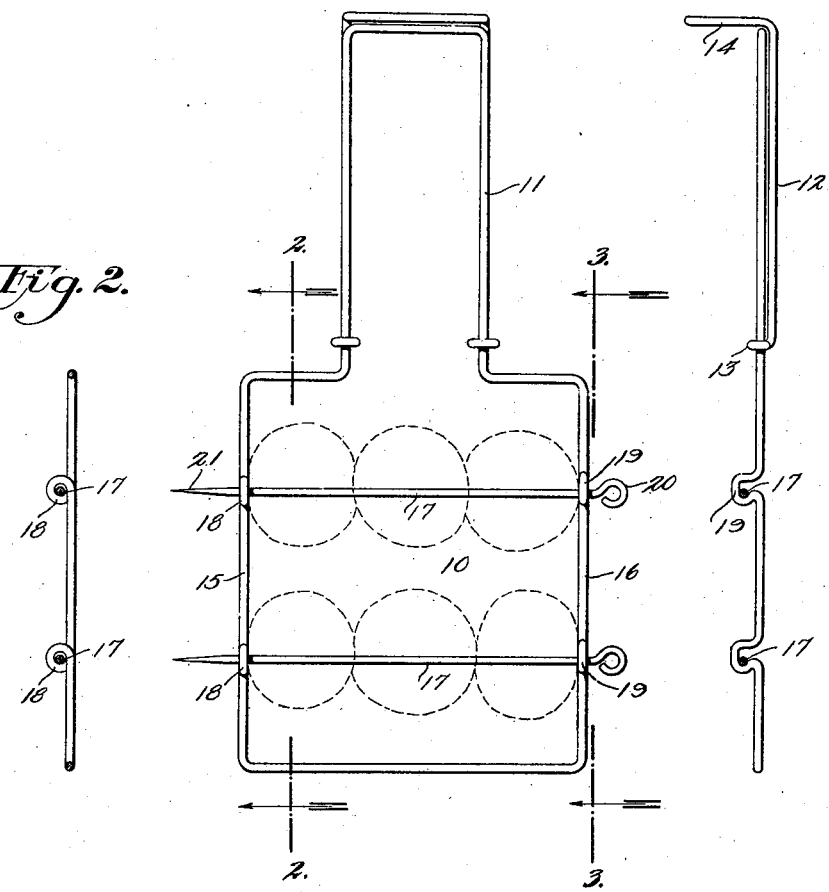

CLARENCE WILSON, OF WAYNESBURG, PENNSYLVANIA.

TOASTER.

1,377,043.  Specification of Letters Patent.  Patented May 3, 1921.

Application filed January 3, 1920. Serial No. 351,185.

*To all whom it may concern:*

Be it known that I, CLARENCE WILSON, a citizen of the United States, and a resident of Waynesburg, Greene county, State of Pennsylvania, have invented a new and Improved Toaster, of which the following is a full, clear, and exact description.

This invention relates to cooking utensils, and more particularly to toasters.

Some of the principal objects and advantages to be accomplished by the present invention are; to provide a toaster which is constructed in such a manner as to permit of the same being either suspended from the front of a stove or grate, or the laying of the same on a heated surface for supporting food to be toasted; to provide a toaster especially designed and adapted for toasting marshmallows, but which may also be utilized for toasting bread, cheese or other articles of food; and to provide a simple and inexpensive article of manufacture consisting of a minimum number of parts which may be cheaply manufactured and easily assembled.

With these and other objects in view, the nature and purpose of which will be more specifically set forth hereafter, reference is made to the following description, claims and accompanying drawings forming a part of this application.

In the drawings;

Figure 1 is a plan view of the toaster.

Fig. 2, a sectional view taken on the line 2—2 of Fig. 1.

Fig. 3 is a similar view on the line 3—3 of Fig. 1.

Fig. 4, a modified form illustrating one of the several uses to which the same may be adapted.

Referring to the drawings by characters of reference which denote like parts throughout the several views thereof, 10 designates a supporting frame of rectangular configuration, and preferably constructed of wire, the same having formed as an integral part thereof, a handle 11. A supplemental adjustable handle section 12 of substantially U-shaped formation is designed to be slidably associated with the handle 11 by a suitable means here shown as eyes 13 formed at the free terminals of the side branches; said eyes being adapted to freely receive the side branches of the handle 11. The upper free extremity or bight of the handle 12 is arranged at a right angle to the major portion of the same, as illustrated at 14, in order to provide suitable means by which the toaster may be suspended from the front of a stove or grate during the toasting operation. The opposing side portions 15 and 16 of the frame 10 are formed with oppositely disposed receiving and supporting means for the reception of tines 17, said means being here illustrated as alined bearings 18 and 19, the former being preferably formed by bending the side portion into loops as illustrated, and the latter by bending the side portion 16 to constitute substantially a bayonet slot. By this arrangement the ringed extremities 20 of the tines may be disengaged from the bearings 19 prior to the withdrawal of their pointed ends 21 from the looped bearings 18 or vice versa, in order to permit the articles to be toasted to be positioned and removed from the tines prior to their association with the frame.

In use of the device, the articles to be toasted are threaded upon the tines 17, which are then associated with the supporting frame by first positioning the pointed ends thereof within the bearings 18, and engaging the opposite ends within the bearings 19. The frame is then subjected to the direct action of the heat of a fire for toasting the articles arranged on the tines, by suspending the same from a grate or stove by means of the handle. By the arrangement of the tines in the supporting frame in the manner heretofore described, it will be understood that the articles may be toasted evenly by intermittently revolving the tines in the bearing.

In the modified form illustrated in Fig. 4 of the drawings, the side portions 15 and 16 of the frame 10 are curved longitudinally in order to permit the frame to be supported directly on a heated surface for toasting slices of bread which are laid across the tines, the curvature of said side portions serving to properly space the articles with respect to the heated surface.

While several preferred embodiments of the invention have been illustrated, it is understood that the same are merely illustrative, and no limitation is made to the precise details of construction, but changes and alterations falling within the scope of the appended claims may be resorted to when found expedient.

Having thus described my invention, what

I claim as new and desire to secure by Letters Patent is as follows;—

1. A toaster including a plurality of tines and a support constructed of a single length of wire bent upon itself to provide a rectangular frame and a handle, the opposite side rails of said frame being of arcuate formation and provided with spaced offset bends to provide bearings for the tines, whereby the support may be arranged in a horizontal plane on a stove for supporting the article to be toasted on the tines in spaced relation to the stove or whereby the articles to be toasted may be penetrated by the tines and the support suspended vertically by its handle.

2. In a toaster, a plurality of tines and a support therefor constructed from a single length of wire bent upon itself to provide a rectangular frame having a handle projecting from one of its end rails, the opposite side rails of said rectangular frame being curved longitudinally and provided with spaced bends to provide bearings for the tines, whereby the support may be arranged horizontally for supporting articles to be toasted, which articles rest upon the tines or whereby the frame may be supported vertically with the articles to be toasted penetrated by the tines.

CLARENCE WILSON.